July 6, 1948.  M. L. ROGERS  2,444,851
HEATING AND BRAZING TORCH
Filed Oct. 29, 1946
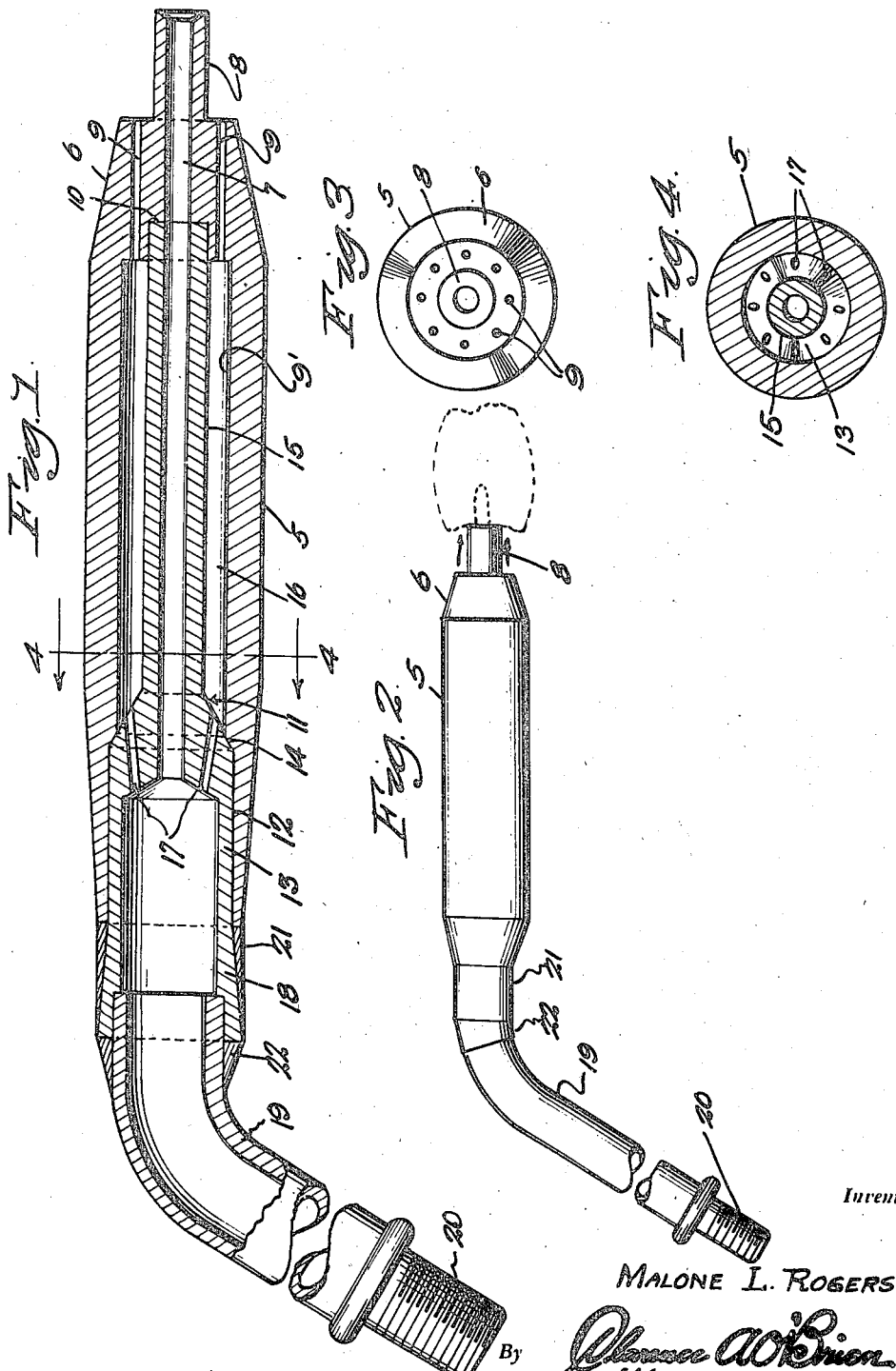
Inventor
MALONE L. ROGERS
By
Attorneys Patented July 6, 1948

2,444,851

UNITED STATES PATENT OFFICE 2,444,851

HEATING AND BRAZING TORCH

Malone L. Rogers, Portsmouth, Va.

Application October 29, 1946, Serial No. 706,492

2 Claims. (Cl. 158—27.4)

This invention relates to improvements in torches of that type having a single gas supply duct, adapted to use propane or like gas having a slow rate of flame propagation, and including a tip which affords a relatively non-intense flame jet such as is required for heating and brazing metals.

It is well known in the art that torch tips have the objectionable fault of getting very hot in use and transmitting the heat to the rest of the torch. An important object of the present invention, therefore, is to provide a torch tip that will be free of this heating fault.

Another object is to provide an improved heating and brazing torch tip having an inner passage supplying the gas to a heating flame jet, and means surrounding the inner passage to supply the gas about the heating flame jet.

A further object is to provide an improved heating and brazing torch tip which includes central and outer tip members constructed and assembled to facilitate ready and economical manufacture, and to effectively supply the gas through an inner passage to an inner heating jet and through holes surrounding the inner passage to and about the heating flame jet.

The exact nature of the present invention, as well as more specific objects and features thereof, will become apparent from the following description when considered in connection with the accompanying drawing, in which:

Figure 1 is a view partly in side elevation, partly broken away, and partly in central longitudinal section, of a heating and brazing torch tip constructed in accordance with the present invention;

Figure 2 is a side elevational view of the torch tip shown in Figure 1, drawn on a smaller scale;

Figure 3 is an end elevational view looking towards the left of Figure 1;

Figure 4 is a transverse section taken on line 4—4 of Figure 1.

Referring in detail to the drawing, 5 indicates the outer tip member or body which has a tapered tip end 6 provided with an axial opening or passage 7 and formed with a tubular axial extension 8 whose bore forms a continuation of the opening or passage 7. Also, the tip end 6 is provided with a circular series of small holes therethrough as at 9 parallel with and about the opening 7. The member or body 5 also has a main bore 9', while a socket 10 is provided centrally of and in the inner wall of the tip end 6. At its inner end, the body 5 is provided with a counterbore 12.

The numeral 11 indicates the inner tip member which has a hollow cylindrical inner end portion 13 that is snugly received in the counterbore 12 and seated at its outer end on the tapered shoulder 14 provided in the outer member or body 5 at the juncture of the main bore 9' with the counterbore 12. The inner tip member 11 also includes a reduced tubular outer end portion 15 that projects axially from the outer end of the inner portion 13 and is snugly received in the central socket 10 so that the inner tip member is firmly supported in place with the bore of the outer end portion 15 aligned with the opening or passage 7. A relatively large capacity gas chamber 16 is thus provided about the part of the portion 15 within the main bore 9'. A plurality of holes 17 are drilled through the inner end of the inner portion 13 of the inner tip member 11 to afford communication between the interior of portion 13 and chamber 16. Thus, gas supplied to the interior of the portion 13 will pass through the bore of portion 15, opening 7 and the bore of extension 8 for supplying the gas to a central heating flame jet. Gas is also supplied from the interior of portion 13 through holes 17 to chamber 16, from whence the gas flows through the holes 9 to augment the central heating flame jet. This gas issuing from the holes 9 about the central flame jet draws air over the outside surface of the tip body and thus prevents heat radiating back into and heating the tip and the rest of the torch. Also, the gas issuing from holes 9 keeps the flame at the outer end of the extension 8 and in spaced relation to the end of the body 5 about said extension 8, so that objectionable heating of the tip is further minimized as further indicated in Figure 2.

The inner portion 13 has an inwardly projecting extension 18 beyond the inner end of the body 5, and this extension 18 receives an end of a single gas supply duct 19 that has a threaded inner end 20 to facilitate connection of the tip to an ordinary torch handle provided as usual on an end of an ordinary gas supply hose, not shown. The parts 5, 11 and 19 are permanently adjoined in assembled relation by providing welding fillets 21 and 22, of metal, about the extension 18 of portion 13 and about the duct 19 adjacent the extension 18. The whole unit may then be plated exteriorly to provide a finished construction.

In operation, the end 20 of duct 19 is connected to a torch handle in the well known way, and the gas is supplied to said duct 19 so that it passes into the portion 13 of the inner tip member 11 and through the central bore of portion 15, opening 7 and the bore of extension 8 to supply the central heating flame jet. The gas also passes from portion 13 through holes 17 and fills the chamber 16 so that a constant supply of gas is afforded in the latter to pass outwardly through the holes 9 about the central heating flame jet so as to augment the latter.

From the foregoing description, it is believed that the construction, operation and advantages of the present invention will be readily understood and appreciated by those skilled in the art. Modifications and changes in construction are contemplated, such as fall within the scope of the invention as claimed.

What I claim is:

1. A heating and brazing tip comprising an outer tip member having a main bore intermediate its ends, a counterbore at its inner end, and a central axial opening through its tip end, an integral tubular extension on the tip end of said outer tip member having a bore aligned with said central opening, said outer tip member further having a circular series of small holes therethrough parallel with and about said central opening, and an inner tip member having a hollow cylindrical inner portion fitted in said counterbore of the outer tip member and a reduced axial outer portion extending through the main bore to define a surrounding large capacity gas chamber, said outer portion having an axial bore aligned with said central opening, the bore of said outer portion and the central opening and the bore of said extension supplying gas to a central heating flame from said hollow inner portion of the inner tip member, said inner portion having holes through its outer end leading to said gas chamber, gas flowing from said gas chamber through said holes supplying a restricted amount of gas from said chamber about said heating flame and keeping the latter forwardly at the forward end of said extension.

2. The construction defined in claim 1, wherein the tip end of the outer tip member has a central socket in the inner wall thereof, said axial outer portion of the inner tip member having its outer end seated in said socket.

MALONE L. ROGERS.